US011410155B2

(12) United States Patent
Gauli et al.

(10) Patent No.: US 11,410,155 B2
(45) Date of Patent: Aug. 9, 2022

(54) SECURE SCANNABLE CODE SYSTEMS AND METHODS

(71) Applicant: Amazon Technologies, Inc., Seattle, WA (US)

(72) Inventors: Biraj Gauli, Seattle, WA (US); Sanjay Dash, Mercer Island, WA (US); Smita Joshi, Issaquah, WA (US); Siddharth Lathia, Kirkland, WA (US); Margaret Draughon Poole, Seattle, WA (US); Bilyana Slavova, Redmond, WA (US); Jiajun Zhao, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 482 days.

(21) Appl. No.: 15/470,463

(22) Filed: Mar. 27, 2017

(65) Prior Publication Data
US 2018/0276651 A1    Sep. 27, 2018

(51) Int. Cl.
*G06Q 20/32* (2012.01)
*G06Q 20/40* (2012.01)
*G06Q 20/08* (2012.01)
*G06K 19/06* (2006.01)
*G06K 7/14* (2006.01)
(Continued)

(52) U.S. Cl.
CPC ....... *G06Q 20/3274* (2013.01); *G06K 7/1404* (2013.01); *G06K 19/06009* (2013.01); *G06K 19/06037* (2013.01); *G06K 19/10* (2013.01); *G06Q 20/08* (2013.01); *G06Q 20/405* (2013.01); *H04W 4/80* (2018.02); *H04W 12/068* (2021.01)

(58) Field of Classification Search
CPC ...... H04W 4/80; H04W 12/06; G06K 7/1404; G06K 19/06009; G06K 19/06037; G06K 19/10; G06Q 20/08; G06Q 20/32; G06Q 20/405; G06Q 20/3274
See application file for complete search history.

(56) References Cited

U.S. PATENT DOCUMENTS

| 7,774,461 B2 * | 8/2010 | Tanaka | H04L 45/26 709/224 |
| 2005/0137961 A1 * | 6/2005 | Brann | G06Q 40/04 705/37 |

(Continued)

OTHER PUBLICATIONS

Leach et al. "A Universally Unique Identified (UUID) URN Namespace." Standards Track. RFC 422. Network Working Group. The Internet Society. Jul. 2005.

(Continued)

*Primary Examiner* — John W Hayes
*Assistant Examiner* — Ari Shahabi
(74) *Attorney, Agent, or Firm* — Knobbe, Martens, Olson & Bear, LLP

(57) ABSTRACT

Features are disclosed for recognizing network-based user in a physical location. A system is provided for generating and detecting a scannable code. A time-sensitive scannable code unique to the user may be generated and presented by an electronic device such as a smartphone. The time-sensitive scannable code may be scanned at transaction terminal in the physical store. Using the scannable code, the system may securely determine that user profile information from the user's network-based activity may be provided to the transaction terminal for use in the physical location.

18 Claims, 7 Drawing Sheets

(51) Int. Cl.
G06K 19/10 (2006.01)
H04W 4/80 (2018.01)
H04W 12/06 (2021.01)

(56) References Cited

U.S. PATENT DOCUMENTS

| | | | | |
|---|---|---|---|---|
| 2010/0125510 | A1* | 5/2010 | Smith | G06Q 20/105 |
| | | | | 705/17 |
| 2011/0271099 | A1* | 11/2011 | Preiss | H04L 63/0807 |
| | | | | 713/155 |
| 2013/0043302 | A1* | 2/2013 | Powlen | G06Q 50/01 |
| | | | | 235/375 |
| 2015/0178721 | A1 | 6/2015 | Vijayakumar et al. | |
| 2015/0254635 | A1* | 9/2015 | Bondesen | G06Q 20/36 |
| | | | | 705/41 |
| 2015/0310417 | A1 | 10/2015 | Syed | |
| 2016/0125401 | A1* | 5/2016 | Li | G06Q 10/087 |
| | | | | 235/380 |

OTHER PUBLICATIONS

"Universally unique identifier" (Feb. 24, 2017) Wikipedia, The Free Encyclopedia. Retrieved Feb. 28, 2017, from https://en.wikipedia.org/w/index.php?title=Universally_unique_identifier&oldid=767180049.

International Search Report for International Application No. PCT/US2018/023353 dated Jul. 12, 2018.

* cited by examiner

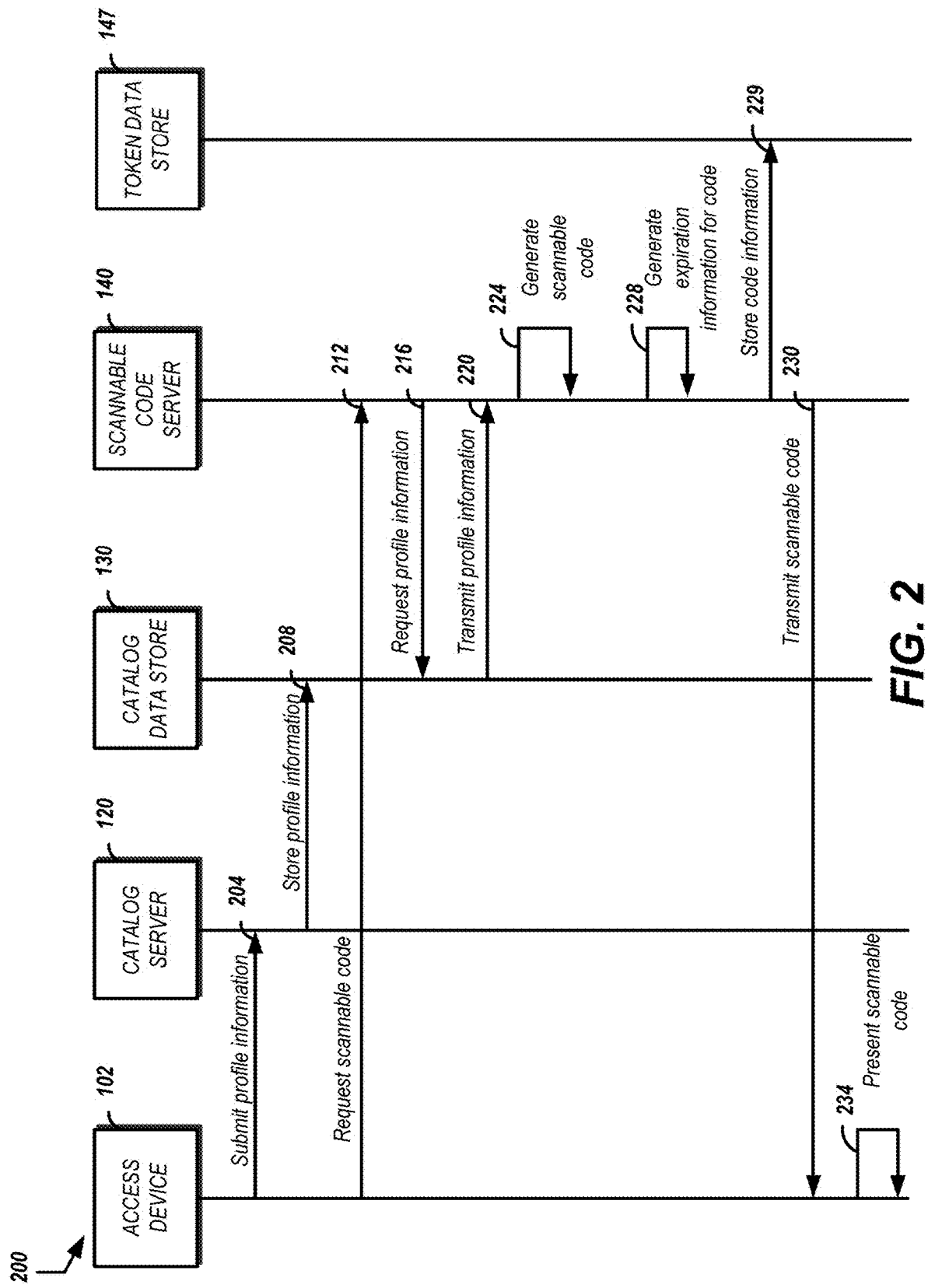

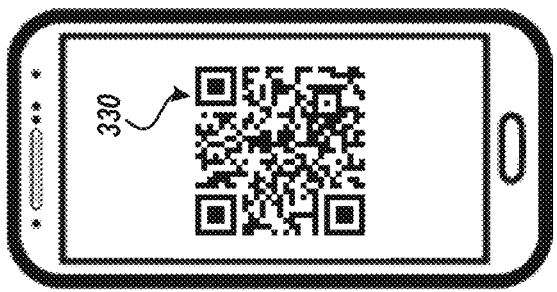
FIG. 3D
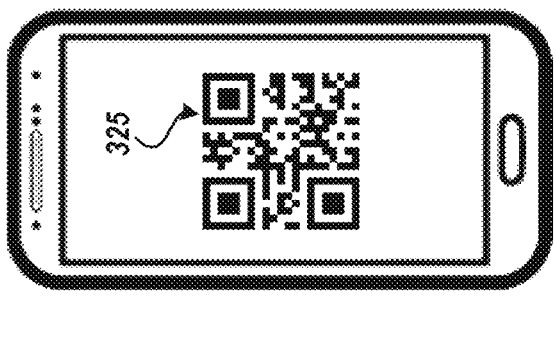
FIG. 3C
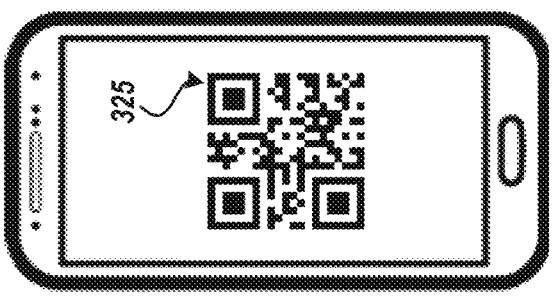
FIG. 3B
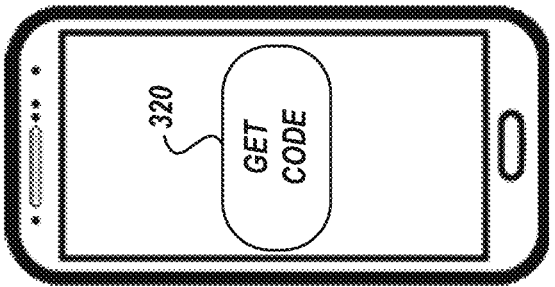
FIG. 3A

SECURE SCANNABLE CODE SYSTEMS AND METHODS

BACKGROUND

Electronic commerce has become increasingly popular with consumers as the accessibility and ease of placing orders electronically or via the Internet continues to improve. At the same time, network-based service providers continue to expand the availability of items available for purchase, lease, or other type of acquisition, electronically or via the Internet. As a result, users may choose from a variety of items.

Some network-based service providers may establish or associate with physical locations. This allows the network-based service to support in-person interactions with users.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 2 is a schematic diagram of communications exchanged between components of an illustrative interactive computing system for an example request for a scannable code.

FIGS. 3A-3D are pictorial diagrams of example interface states for a scannable code request.

DETAILED DESCRIPTION

Figure 1:
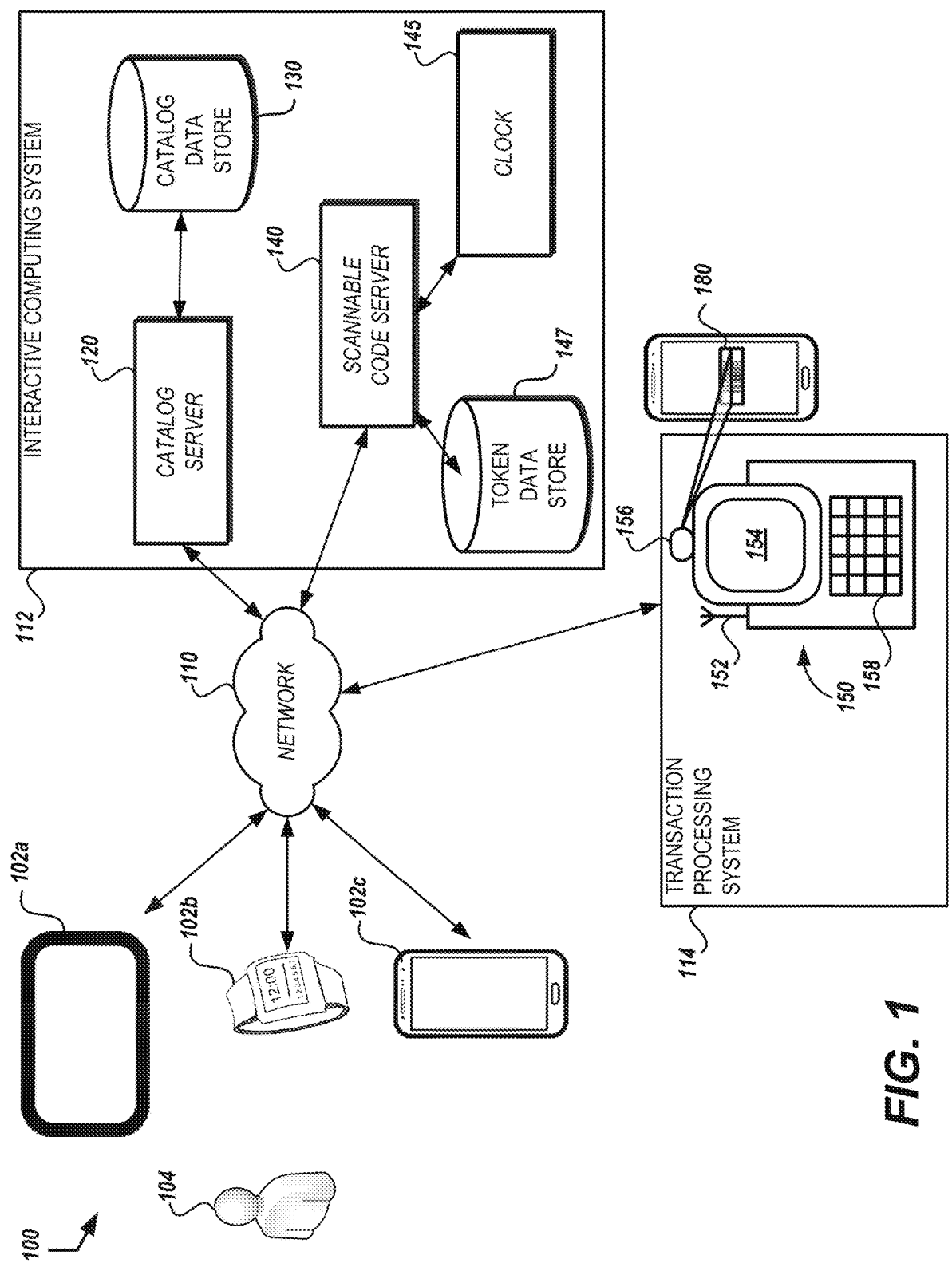
FIG. 1 is a block diagram of an environment for securely processing scannable codes.

Generally described, aspects of the present disclosure relate to a system that bridges the gap between a user's network-based identity and real-world presence. More specifically, one or more aspects of the present application relate to generating secure scannable codes that can be presented in a physical location and used to provide information from a user's network-based profile. By way of an illustrative example, a user may subscribe to a premium feature of a network-based service such as a loyalty program or exclusive content access. When the user arrives at a physical location associated with the network-based service, the user may expect the same premium features experienced in the network-based service. Using an access device, such as a smartphone, tablet computer, smart watch, or other mobile electronic communication device, the user may request a scannable code. The scannable code may be detected in the physical location and used to identify the user and user profile information associated with the user.

The scannable code may be scanned using optical techniques such as image scanning or infrared scanning. The scannable code may be transmitted using wireless techniques such as near field communication, BLUETOOTH™, or other standardized or proprietary wireless messaging technology. The scannable code may be scanned at a transaction terminal (e.g., a point of sale device) in the physical location, such as during check out. The scanning may be performed at a kiosk in the physical location as the user browses the physical location. Profile information the user has provided via the network-based system can be accessed by a transaction processing system in the physical location. Such information may include, but is not limited to transaction information, address information, demographic information, personal identification, subscriptions, content access history, or other data stored or accessible by the network-based system.

The scannable code alone may not include the user profile information, but rather may provide a pointer, token, or other identifier that can be used to access a set of information stored by the network-based system. The scannable code may be processed by a scannable code server to determine whether the code is valid and, if so, retrieve the personal information from the network-based system and transmit the retrieved information to the physical location (e.g., point of sale or kiosk). The scannable code server can also select or otherwise filter the personal information based on user preferences, vendor requirements, and the like.

The features described herein address a variety of problems in the field of identifying network-based users in the physical world. For example, because the information available via the network-based service may be sensitive (e.g., name, address, account details, content viewing history), ensuring that the scannable code is secure can be an important factor in whether users will utilize the scannable codes. As described in further detail below, the scannable code may be associated with a timestamp received from a clock. This clock may serve as an authoritative source of time information and, using this authoritative source, provide the information needed to determine whether a specific scannable code is valid. For example, the scannable code may be associated with one or more expiration criteria such as one minute, thirty seconds, or one-half hour. If the scannable code is not presented to the system for validation as specified by the expiration criteria, the server may withhold all or a portion of the user profile information associated with the scannable code.

Another aspect of that the present application can include management of changes to user profile information. More specifically, the management of changes can include properly communicating changes or updates to personal information to one or more physical locations. For example, a user may identify a preferred payment or mailing address through the network-based service. While standing in line at a physical location, the user may wish to use an alternative payment (e.g., gift card or business account) or business mailing address.

As one example, consider a user that may establish an account with a network-based service. The service may be accessible through a mobile application that executes on the user's smartphone. Through the mobile application, the user may provide identity information or payment information that can be stored as part of a user profile. If the user further wishes to use such information during a transaction conducted in a physical location (e.g., point of sale terminal or kiosk within a retail location). This may allow the system to: apply special pricing, online gift card balances to make in-store purchases, have purchases archived in a user's order history, email receipts of a user's in-store purchases to a preferred address, or other actions related to an in-store transaction.

One example implementation may include generating a scannable code that can be used to identify a user. The scannable code may be a server-generated, secure, opaque string including one or more of: a universally unique identifier (UUID), a discriminator, and an encoding version identifier. The scannable code may be encoded and presented, such as on a display of a smartphone, so that a device at the transaction terminal (e.g., a point of sale scan gun) can scan and initiate decoding of the scannable code. Encoding the scannable code may include quick read (QR) code encoding. The scannable code may be associated with a limited lifespan (e.g., configurable to a static criterion or dynamically generated criterion to account for the specific time or place the scannable code will be presented).

Some implementations may display the aspects of a user profile that will be applied for a transaction. An example aspect is the payment instrument utilized to complete transactions. A user interface presented on the user's device may receive an update to the payment instrument. The update may indicate a change from the default payment instrument specified for transactions on the network-based service to a specific instrument for the present, in-store transaction. In some implementations, changes to the payment preference may be persisted and used as a default preference next time the customer loads the feature at the in-store location.

To ensure timely presentation of a valid scannable code, it may be desirable to receive a second scannable code once the first scannable code is presented but before the first scannable code expires. This second scannable code could thus be received and ready for presentation when the first scannable code expires. The scannable codes may be refreshed continually until a terminating event is detected. Examples of a terminating event may include: a time threshold is reached, the access device presents a threshold number of scannable codes, the access device moves away from the in-store location, or if the access device is adjusted to exit from the interface presenting the scannable codes.

After the scannable code is presented and the user is ready to perform a transaction, a transaction system at the physical location may scan the scannable code, decode the scannable code, and request additional information about the user associated with the scannable code. The additional information may include user profile information for the user. The additional information, such as payment preference, may be received at the transaction system and applied to the transaction.

Although aspects of some embodiments described in the disclosure will focus, for the purpose of illustration, on scannable codes and other configurations of the devices for requesting, generating, and processing scannable codes, one skilled in the relevant art will appreciate that the examples are illustrative only and are not necessarily intended to be limiting.

FIG. 1 is a block diagram of an environment for securely processing scannable codes. The environment 100 includes an interactive computing system 112 which may be a network-based service. The interactive computing system 112 may include a catalog server 120. The catalog server 120 may include various computer-implemented services through which sellers can list products for sale in a preexisting electronic catalog, and users can browse the catalog to interact with items. A user 104 may access the catalog server 120 through an access device such as a tablet computer 102a, a wearable device 102b, or a mobile device 102c (collectively or individually referred to as the access device 102) via a network 110. A "user" may refer to an individual, or a set of individuals, associated with a particular user account. In some contexts, "user" may also refer to an individual who has not yet set up an account.

The catalog server 120 may store user interactions in the catalog data store 130. The type of interaction, date of interaction, duration of interaction, and identifier of the user or device performing the interaction may be identified and stored in the catalog data store 130 by the catalog server 120. The interaction may include maintaining user profile information including address, payment information, subscription, and the like. As shown in FIG. 1, the catalog server 120 is included in the interactive computing system 112. However, it will be appreciated that the scannable code elements (e.g., scannable code server 140, clock 145, and associated data stores) may be implemented separately from the catalog server 120.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

The interactive computing system 112 may include a scannable code server 140. The scannable code server 140 may be configured to generate scannable codes for presentation via an access device. In some implementations, a scannable code 180 may be a machine-readable code, e.g., optical code, one dimensional (1D) bar code, two dimensional (2D) bar code, recognizable text characters, or an image. In the case of a 2D bar code (also referred to as a "matrix code"), the scannable code 180 may be a QR® or "quick response" code, an EZCode® bar code, a PDF417 or "portable data file" bar code, a high capacity color bar code, etc., In some implementations, the scannable code 180 may not be optically detected. For example, the scannable code 180 may be wirelessly transmitted such as a radio frequency identification (RFID) tag, near field communication (NFC) tag, BLUETOOTH® signal, or magnetic tag that provides information. In such implementations, an RFID, NFC, BLUETOOTH®, or other suitable transceiver may be included on the access device 102. The interactive computing system 112 may include a token data store 147 configured to store the scannable codes generated by the scannable code server 140. In some implementations, the token data store 147 may store the expiration criteria for a scannable code. One or more expiration criteria may be based on time, location, device identifier, user identifier, transaction terminal, transaction type, or other information provided by the access device or transaction terminal. For example, a clock 145 may be included to provide timestamp information for the scannable codes generate by or authenticated by the scannable code server 140. The clock 145 may be the authoritative source for time when determining whether a scannable code is expired. The clock 145 may provide timestamp information with low-latency to the scannable code server 140 to ensure secure and accurate timing measurements.

The scannable code 180, when presented by an access device, can be detected such as at a transaction processing system 114. The transaction processing system 114 may include a transaction terminal 150 that may be used to optically scan the scannable code 180, which may be implemented as a bar code. The transaction terminal 150 may include an optical scanner 156 configured to read the scannable code 180. The scannable code 180 or value encoded thereby may be transmitted to the scannable code server 140 for verification. If verified, the transaction terminal 150 may receive user profile information that can be used for a transaction at or near the transaction terminal 150.

The transaction terminal 150 may include a wireless transceiver 152 configured to transmit standardized or proprietary, computer-readable messages to the scannable code server 140. In some implementations, the communication may be direct between the transaction terminal 150 and the scannable code server 140. In some implementations, the communication may be via the network 110.

Location information may be used in generating or validating scannable codes. The location of the transaction terminal 150 may be included in the request for validation of the scannable code 180. Similarly, the location of the access device presenting the scannable code 180 may be received by the scannable code server 140. The location may be determined using a component integrated in the respective device such as a global positioning system (GPS) receiver for use with a global positioning system. In other implementations, emissions from a wireless transmitter of the device may be used as an alternative or additional source of location information. For example, the transmitted signal strength and direction may be used to estimate the location of the access device. In such implementations, the location of the device may be maintained by a device location registry (not shown). Current location, prior locations, or a combination thereof may be stored in the device location registry. The device location registry may include a machine interface for sending and receiving structured, unstructured, or semi-structured messages to request or obtain location information about access devices or transaction terminals within the environment 100. If the scannable code server detects a deviation from historical locations for an access device, the scannable code server may execute additional security measures to ensure the scannable code is being provided to an authorized user. The additional security measures may include: requesting additional authentication information, presenting a predefined personal question to the user (e.g., "What was your childhood nickname?"), two-factor authentication, or other process to confirm the request for a scannable code is authorized.

The transaction terminal 150 may also include a display 154 or an input interface 158. The display 154 may be a screen, touchscreen, or other visual display for providing feedback to a user of the transaction terminal 150. The input interface 158 shown in FIG. 1 is a keypad. Additional or alternative input interfaces may be included. For example, the display 154 may be a touchscreen that may function as both a display 154 and the input interface 158. Additional feedback may be provided by an audio output (not shown). For instance, when the scannable code 180 is successfully scanned, a beep may be emitted from an audio output. The display 154 may also be configured to present information about the validation of a scanned code or adjustments to a transaction based on user profile information received in response to a valid code. Such information may be received from the scannable code server 140. In such implementations, the transceiver 152 may be configured to receive user profile information through a wireless communication channel for presentation via the display 154.

The network 110 may be a wired network, wireless network or combination thereof. In addition, the network 110 may be a personal area network, local area network, wide area network, cable network, satellite network, cellular telephone network, etc. or combination thereof. For example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or some other type of wireless network. The network 110 may use protocols and components for communicating via the Internet or any of the other aforementioned types of networks.

The environment 100 is depicted in FIG. 1 as a distributed computing environment including several computer systems that are interconnected using one or more computer networks. The interactive computing system 112 could also operate within a computing environment having a fewer or greater number of devices than are illustrated in FIG. 1. Thus, the depiction of interactive computing system 112 in FIG. 1 should be taken as illustrative and not limiting to the present disclosure. For example, the interactive computing system 112 could implement various Web service components and/or peer to peer network configurations to implement at least a portion of the processes described herein.

FIG. 2 is a schematic diagram of communications exchanged between components of an illustrative interactive computing system for an example request for a scannable code. The diagram of FIG. 2 shows messages between the access device 102, the catalog server 120, the catalog data store 130, the token data store 147, and the scannable code server 140. It will be appreciated that other intermediary elements may be included. For the sake of clarity, these intermediaries have been omitted from FIG. 2 and the description thereof.

As illustrated in FIG. 2, the access device 102 submits a message 204 including profile information for the user. The message 204 may be submitted to the catalog server 120. The message 204 may include information collected through an interface presented on the access device 102 such as a mobile application or a web-browser based application. The profile information may include payment information, address information, subscription information, or the like.

Via message 208, the catalog server 120 may store the user profile information in the catalog data store 130. Storing may include indexing the user profile information based on an identifier for the user or the access device 102. The catalog data store 130 may provide the user profile information for transactions via the network-based catalog service or, as will be described, through the scannable code server 140 for physical transactions.

Message 212 may be transmitted from the access device 102 to the scannable code server 140. The message 212 may be transmitted in response to the access device 102 entering a physical location associated with the network-based service such as a physical store. In such implementations, the access device 102 may monitor the current location of the device. The current location of the access device 102 may be compared to a stored set of locations associated with the network-based service. If the comparison indicates a correlation between the current location and a location included in the set of locations, then the message 212 may be transmitted by the access device 102. In some implementations, a user of the access device 102 may request transmission of the message 212 such as by activating a feature included in the mobile application. When the feature is activated, the access device 102 may generate and transmit the message 212 to the scannable code server 140.

The message 212 may include one or more of: location information for the access device 102, information identifying the user of the access device 102 such as a user name or account number, information identifying the access device 102 such as a media access control (MAC) identifier or mobile equipment identifier (MEID), or information identifying a communication session between the access device 102 and the interactive computing system 112.

Based at least in part on information included in the message 212, the scannable code server 140 may transmit a request message 216 for profile information of the user to the catalog data store 130. For example, if the message 212 includes a user identifier, the user profile associated with the user identifier may be retrieved from the catalog data store 130.

Message 220 may provide the user profile information to the scannable code server 140. The user profile information may include a portion of the user profile information collected by the interactive computing system 112. The portion may be identified based on one or more of: the current location of the access device, an identifier for an application executing on the access device that requested the scannable code, or privacy preferences provided by the user.

The scannable code server 140 may generate a scannable code using message 224. The generation of the scannable code may include generating a value that can be presented to the scannable code server 140 indicating that the party presenting the value is authorized to receive at least a portion of the user profile information received via message 220. The generation of the scannable code may include generating a random or pseudo-random universally unique identifier (UUID). Generating a UUID may include receiving unique values of MAC addresses to guarantee uniqueness, the pseudo-random number generators, or the cryptographic hashing and application-provided text strings. The UUID may include fixed length fields of hexadecimal values. The format may follow a standard such as Internet Engineering Taskforce UUID version 3 or 5. Information from the user profile may be used to generate the scannable code. For example, payment information for a user may be used as an input to a function that generates a UUID.

In some implementations, the value may include a discriminator portion. The discriminator may be used to identify the scannable code as being generated by the scannable code server. For example, barcodes can take many forms, but the scannable code server may generate highly specific barcodes. The discriminator may be a value included in the scannable code, or other detectable identifier associating the scannable code with the scannable code server. The value may include a version portion. The version portion may indicate what encoding version was used for generating the code. The scannable code may be generated based on the location of the access device. For example, the location may be an input to the function for generating the unique identifier. The scannable code may encode the value (e.g., token) such as using graphics or signaling patterns.

The scannable code server 140 may store the scannable code in a data store such as the token data store 147 shown in FIG. 1. The scannable code may be associated with the user profile information received by the scannable code server 140 in message 220. The scannable code server 140 may generate expiration information for the scannable code using message 228. The expiration information may indicate criteria such as a duration of time during which the scannable code may cause the scannable code server 140 to provide user profile information. If the scannable code is presented to the scannable code server 140 beyond the expiration time, no user profile information may be provided. The scannable code server 140 may generate the expiration information using timestamp information received from a clock. The clock may be a secure clock that serves as the authoritative source of time information for the scannable codes. It may be desirable to have low latency between the clock and the scannable code server 140 to ensure the time information received from the clock is accurate.

The expiration information may be generated as an offset from a time. The offset may be a static configuration value added to the time a given scannable code is generated to provide an expiration time for the given scannable code. In some implementations, it may be desirable to dynamically generate the expiration information to account for differing network conditions such as between the access device 102 and the scannable code server 140 or between the scannable code server 140 and the transaction processing system. Further details regarding the generation of scannable codes and expiration information is provided below with reference to FIG. 5.

Via message 229, the scannable code may be stored in the token data store 147. Expiration criteria associated with the scannable code may be stored in the token data store 147. As discussed above, the scannable code may represent a value. The value may be stored instead of or in addition to an image (e.g., barcode, graphic, QR code, etc.) or other encoding of the value in a scannable code.

Via message 230, the scannable code server 140 may transmit the scannable code to the access device 102. The message 230 may include a message identifier that can be used by the access device 140 to associate the message 230 with the original request message 212.

The access device 102, via message 234, may present the scannable code. Depending on the type of scannable code provided, the access device 102 may activate or deactivate certain features. For example, if the scannable code is visual, the access device 102 may adjust the display to render the scannable code on an interface. If the scannable code is wirelessly presented, the access device 102 may begin emitting a signal (e.g., NFC, BLUETOOTH®, etc.) indicating the scannable code. The presentation is preferable in a form that can be detected by the transaction processing system as discussed.

FIGS. 3A-3D are pictorial diagrams of example states for a scannable code interface. The scannable code interface is one example of visual presentation of a scannable code. Each interface is shown as being presented on an access device. As discussed above, scannable codes may include wireless signals, audible signals, or other detectable patterns of emissions from the access device. For ease of explanation, the discussion uses an optically scannable QR code as an exemplary scannable code.

FIG. 3A shows a first interface state at an initial time (T1). The first interface may be presented as part of an application executing on an access device. The first interface may include a control element 320. The control element 320, when activated, may transmit a request from the access device to the scannable code server. The request may include an identifier of the access device and/or user associated therewith. The scannable code server may then generate a first scannable code 325 and transmit the first scannable code 325 to the access device. As part of generating the first scannable code 325, the scannable code server may access a clock to generate expiration criteria (e.g., expiration time, location, etc.) for the first scannable code. The scannable code server may store the scannable code and the expiration criteria in a data store. In some implementations, the identifier of the user and/or mobile device included in the request may be stored in association with the first scannable code.

FIG. 3B shows a second interface state at a second time (T2). The second time is after the initial time but before the expiration time (exp) for the first scannable code 325. The control element 320 may be replaced by the first scannable code 325 or an indicator that the first scannable code 325 is being presented (e.g., broadcast, shown, etc.) by the access device.

FIG. 3C shows a third interface state at a third time (T3). The third time is after the second time but prior to the expiration time (exp) for the first scannable code 325. In FIG. 3C, a second scannable code 330 is received by the access device in anticipation of the expiration of the first scannable code. In this way, the access device may promptly terminate presentation of the first scannable code 325 and begin presentation of the second scannable code 330. In some implementations, the second scannable code 330 may be received in response to a request from the access device. In some implementations, the second scannable code 330 may be received as a "push" transmission from the scannable code server, without a subsequent request from the access device. The second scannable code 330 may be generated by monitoring a regeneration time. The regeneration time may be specified relative to the expiration time for the first scannable code 325 such that the second scannable code 330 is generated and transmitted prior to the expiration time. The regeneration time or offset may be a static configuration value. In some implementations, the regeneration time may be dynamically determined to account for system factors that may delay the process such as network latency between the scannable code server and the access device, load of the scannable code server, or the like.

The second scannable code 330 may be stored in memory of the access device until the expiration of the first scannable code 325. In some implementations, it may be desirable to allow the receipt of the second scannable code 330 serve as the triggering event for replacing the scannable code presented by the access device. In such implementations, the access device may switch from presenting the first scannable code 325 to presenting the second scannable code 330 when the scannable code is received by the access device.

FIG. 3D shows a fourth interface state at a fourth time (T4). The fourth time is after the expiration time (exp) for the first scannable code 325 and prior to the expiration time (exp') of the second scannable code 330. Accordingly, in FIG. 3D, the access device presents the second scannable code 330 and terminates presentation of the first scannable code 325.

FIGS. 4A-4D are pictorial diagrams of example interface states for a scannable code in conjunction with profile updating. In some implementations, it may be desirable to facilitate updating of profile information while presenting the scannable code. For example, if the user wants to change a default transaction parameter prior to scanning, a drop down or other interface element may be provided to receive the updated profile information.

Figure 4D:
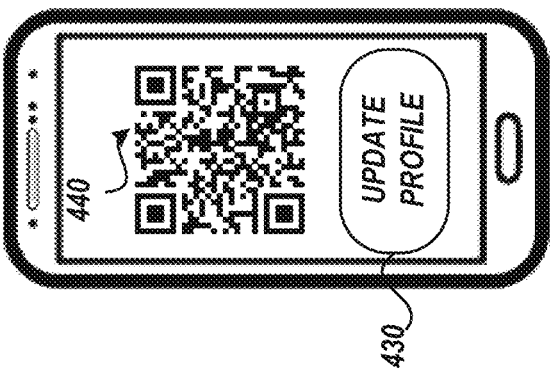
FIGS. 4A-4D are pictorial diagrams of example interface states for a scannable code in conjunction with profile updating.
Figure 4C:
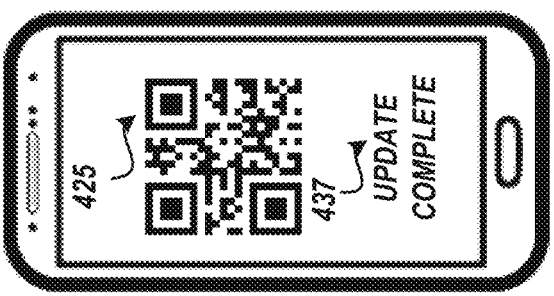
Figure 4B:
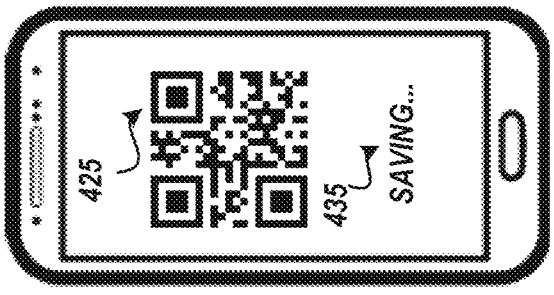
Figure 4A:
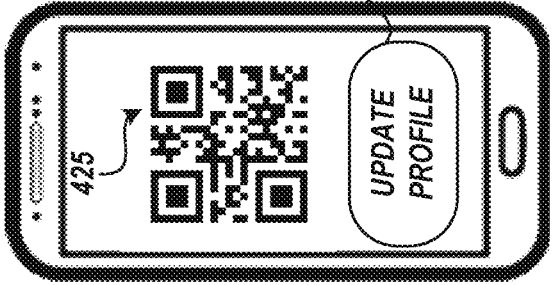

FIG. 4A shows a first state for the interface. The interface includes a first scannable code 425 and a profile update control element 430. The profile update control element 430 may include a drop down menu of options (e.g., payment types, mailing address, loyalty programs, etc.), a free-form text entry field, a button, or other element that, when activated, transmits a request to update the user's profile. The request may be transmitted to the interactive computing system 112 for processing by the scannable code server 140 or the catalog server 120, as shown in FIGS. 1 and 2.

FIG. 4B shows a second state for the interface. The interface, as shown in FIG. 4B, continues to present the first scannable code 425, but also includes an indication 435 that the request for updating the profile information has been received. In some implementations, the update may be applied only for the current session. As such, the interactive computing system 112 may store the update information and provide the updated values in response to requests from a transaction server. In some implementations, the update may be stored and applied to other transactions at the location. For example, a user may update the payment instrument used in-store. If the user conducts another transaction at the store, the updated payment instrument may be the default option for the transaction. The indication 435 may include one or more of: text, images, multimedia, or haptic feedback.

FIG. 4C shows a third state for the interface. The interface, as shown in FIG. 4C, may continue presentation of the first scannable code 425 if the expiration criteria for the first scannable code 425 has not expired. If the expiration criteria are met, the interface may instead show a second scannable code. The access device may receive an indication that the first scannable code 425 is still valid upon successful update of the user profile information. In implementations where the scannable code server manages the update request, the scannable code server may combine an acknowledgement of the updated information with a second scannable code 440 for transmission to the access device. The third state may also include a second indication 437 that the update was successful. The second indication 437 may include one or more of: text, images, multimedia, or haptic feedback. Access device may return to the state shown in FIG. 4A while the first scannable code 425 is not expired.

FIG. 4D shows a fourth state for the interface. The fourth state is similar to the first state except for the scannable code presented by the access device. In the fourth state, the access device presents the second scannable code 440 along with the profile update control element 430. The state shown in FIG. 4D represents the case where the first scannable code 425 has expired. The user may again update profile information using the profile update control element 430 as discussed above.

Figure 5:
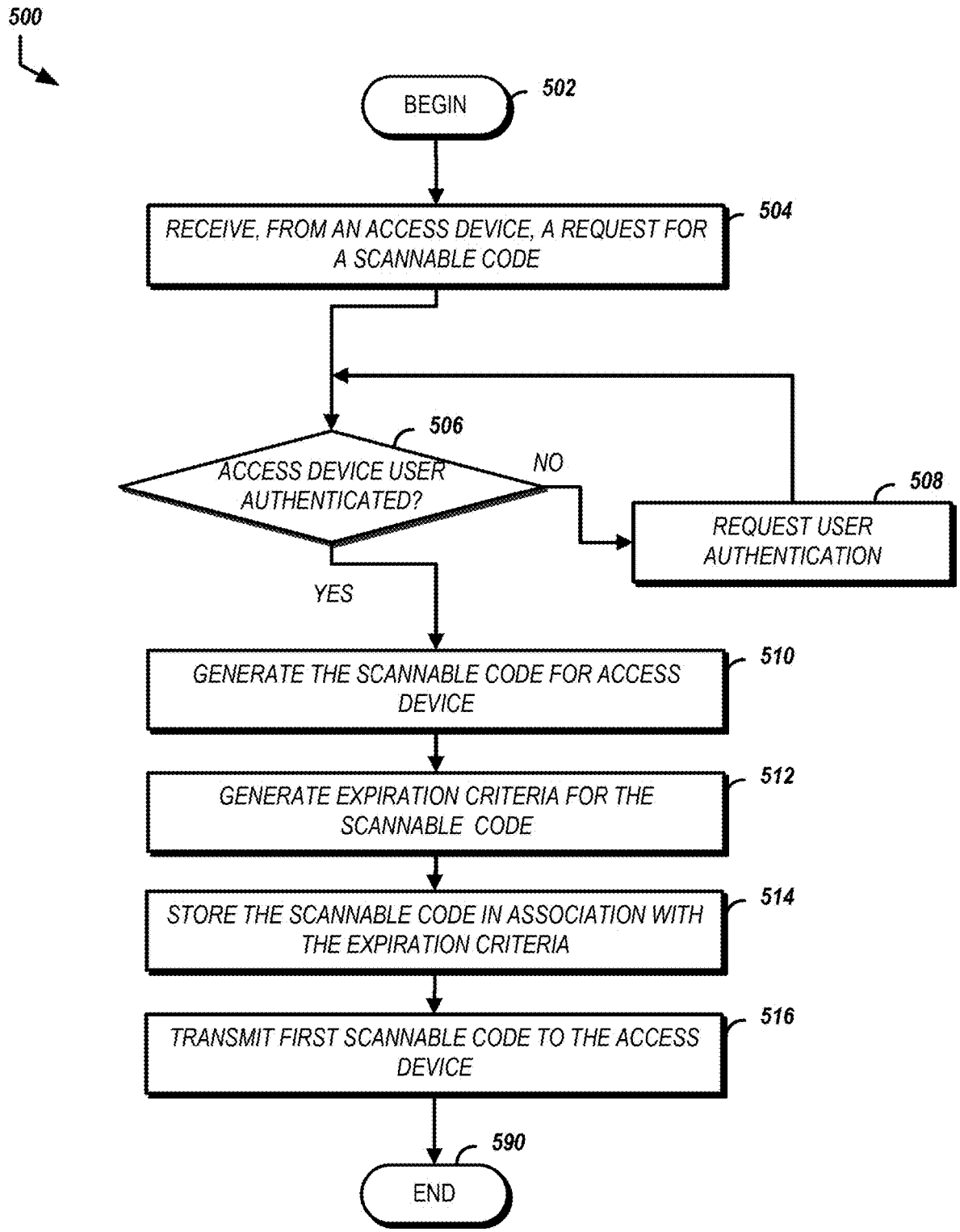
FIG. 5 is a flow diagram of an example method of securely generating a scannable code for a user profile.

FIG. 5 is a flow diagram of an example method of securely generating a scannable code for a user profile. The method 500 may be implemented in whole or in part by one or more of the devices described herein such as the scannable code server 140 shown in FIG. 1 or FIG. 2.

The method 500 begins at block 502. At block 504 a request for a scannable code may be received from an access device. The request may be generated by an application executing on the access device. The request may be initiated by detecting the access device at a location. For example, the access device may emit wireless signals to a wireless receiver (e.g., Wi-Fi® network, beacon, etc.) in a physical location. The wireless receiver may transmit a message to the scannable code server indicating that the access device is in or near the physical location. This message may include the request for a scannable code for presentation via the access device.

At block 506, the scannable code server may determine whether a user of the access device associated with the request is authenticated. The determination may include identifying a session for the access device with the interactive computing system 112. The session information may be stored in a catalog data store such as the catalog data store 130 shown in FIG. 1. The determination may be based on information included in the request such as a session identifier, user identifier, or access device identifier. In some implementations, authentication information may be included in the request. For example, an authorization token may be provided to the access device once the user is authenticated by the catalog server. The authorization token may be used to indicate the user of the access device has completed the authentication process for the system.

If the determination at block 506 is negative, the method 500 may proceed to block 508 where the scannable code server may request user authentication. The request may include transmitting a message causing the access device to acquire authentication information for the user. The access device may acquire the authentication information from an application executing on the access device. In some implementations, the message may cause initiation of an application on the access device that provides inputs for receiving and transmitting the authentication information. Examples of authentication information include username, password, digital credential, biometrics, or the like. Once received, the method 500 may return to block 506 as described above.

If the determination at block 506 is affirmative, the method 500 may continue to block 510. At block 510, a scannable code for the access device may be generated by the scannable code server. The generating at block 510 may include confirming that the system includes user profile information associated with the user. For example, the user may be associated through her profile with the access device or an identifier therefore (e.g., mobile equipment identifier, media access control address, etc.). In some implementations, the association may be between the user and an application executing on the access device. For example, the network-based service may provide a mobile application to allow users to interaction with the network-based service. The user may provide username, password, or other identifying information to log into the mobile application. The mobile application may transmit the identifying information to the scannable code server.

Using the identifying information for the user, the scannable code server may retrieve the user profile information from the data store. In some implementations, the scannable code server may access the data store through another network-based service, such as a catalog server.

The generating at block 510 may include generating a visible scannable code such as a barcode, quick read (QR) code, or the like. The visible scannable code may encode a randomly (or pseudo-randomly) generated value that, when received by the scannable code server, can be verified. Accordingly, the scannable code may not include the user profile information, but rather provides a value (e.g., token) to facilitate retrieval of user profile information from the catalog data store and authorize the transmission of at least a portion of the user profile information, such as to a transaction system. The value generated by the scannable code server may include at least one of: a universally unique identifier, discriminator portion, or an encoding version as discussed above with reference to message 224 of FIG. 2.

The generating at block 510 may include generating a wireless scannable code such as a near field communication code. The wireless scannable code may include the code value to transmit and, in some implementations, parameters for transmitting the code such as signal strength, transmission repetitions, transmission encryption key, and the like. The parameters may be specified in a configuration and identified based on location, transaction type, access device, transaction terminal, or a combination thereof. The access device receiving the wireless scannable code may adjust transmission hardware according to the wireless scannable code to present the scannable code information.

The scannable code server may store the scannable code generated at block 510. The stored code may be used for verification of a scanned code received at a later point in time. In some implementations, the scannable code may be stored in association with the identifying information for the user or the user profile information. If the scannable code server does not store the user profile information, the identifying information for the user may be stored to allow retrieval of the user profile information from the interactive computing system. The identifying information may include a device identifier or a session identifier. The session identifier may indicate a communication session between an access device for a user and the interactive computing system 112. The session may include a log of interactions between the access device and the interactive computing system 112 such as authentication, items viewed, location, and the like.

At block 512, one or more expiration criteria may be associated with the scannable code. Associating the expiration criteria may include identifying an expiration time. Identifying an expiration time may include receiving a current time from a trusted clock such as the clock 145 shown in FIG. 1. The system may be configured to acknowledge scannable codes as valid if received within a period of time identified by the expiration criteria. As such, the current time may then be extended by the period of time to provide the expiration time.

The expiration time may also be generated in consideration of network latencies. For example, the access device may communicate with the scannable code server using a slow network link. In implementations where the scannable code server receives the request for the scannable code from the access device, the request may include or indicate latency data. Latency data may include network header information, a message timestamp, information included in the request, or information discovered about the access device such as from a service provider (e.g., internet service provider).

Another source of network latency may be identified from the transaction server at the location near the access device. For example, a store where a transaction may occur may have a characteristic latency for communications with the scannable code server. This characteristic latency may be identified for each interaction with the scannable code server or identified using historical interactions.

Equation (1) below provides one example expression for dynamically generating the expiration time for a scannable code.

$$\exp = \begin{cases} d + l_{ad} + l_{ts} & \text{if } (d + l_{ad} + l_{ts}) < d_{max}, \\ d + l_{ad} & \text{if } (d + l_{ad}) < d_{max}, \\ & \text{else } d \end{cases} \quad \text{Equation (1)}$$

where exp represents the expiration time;
d represents a duration for honoring a code;
$d_{max}$ represents a maximum duration for honoring a code;
$l_{ad}$ represents latency for the access device; and
$l_{ts}$ represents latency for the transaction system.

Another example of an expiration criterion includes location based expiration. The location based expiration may identify an area or threshold distance from an area where the scannable code is deemed valid. If the scannable code is presented outside the identified area or beyond the threshold distance, the scannable code may be deemed expired. Expiration based on location may be based on the location of the access device. For example, if the access device travels outside the identified area or beyond the threshold distance, the access device may transmit a message to the scannable code server indicating expiration of the scannable code. The message may include the location information of the scannable device and the expiration determination may be performed by the scannable code server rather than by the access device.

At block 514, the scannable code server may store the scannable code in association with the expiration criteria. The information may be stored in a token data store such as the token data store 147 shown in FIG. 1.

At block 516, the scannable code server may transmit the scannable code to the access device. The transmission may be through wired, wireless, or hybrid wired and wireless networks. The transmission may include generating a message including the scannable code for transmission. The message may be a machine readable message such as an extensible markup language message, fixed length field message, binary encoded message, or the like. In some implementations, the message may initiate an application on the access device for presenting the scannable code. For example, an application may be installed on the access device for transmitting wireless scannable codes. The message, upon receipt by the access device, may execute the application to begin wireless transmission of the scannable code.

At block 590, the method 500 may end having transmitted a scannable code to the requesting device.

Figure 6:
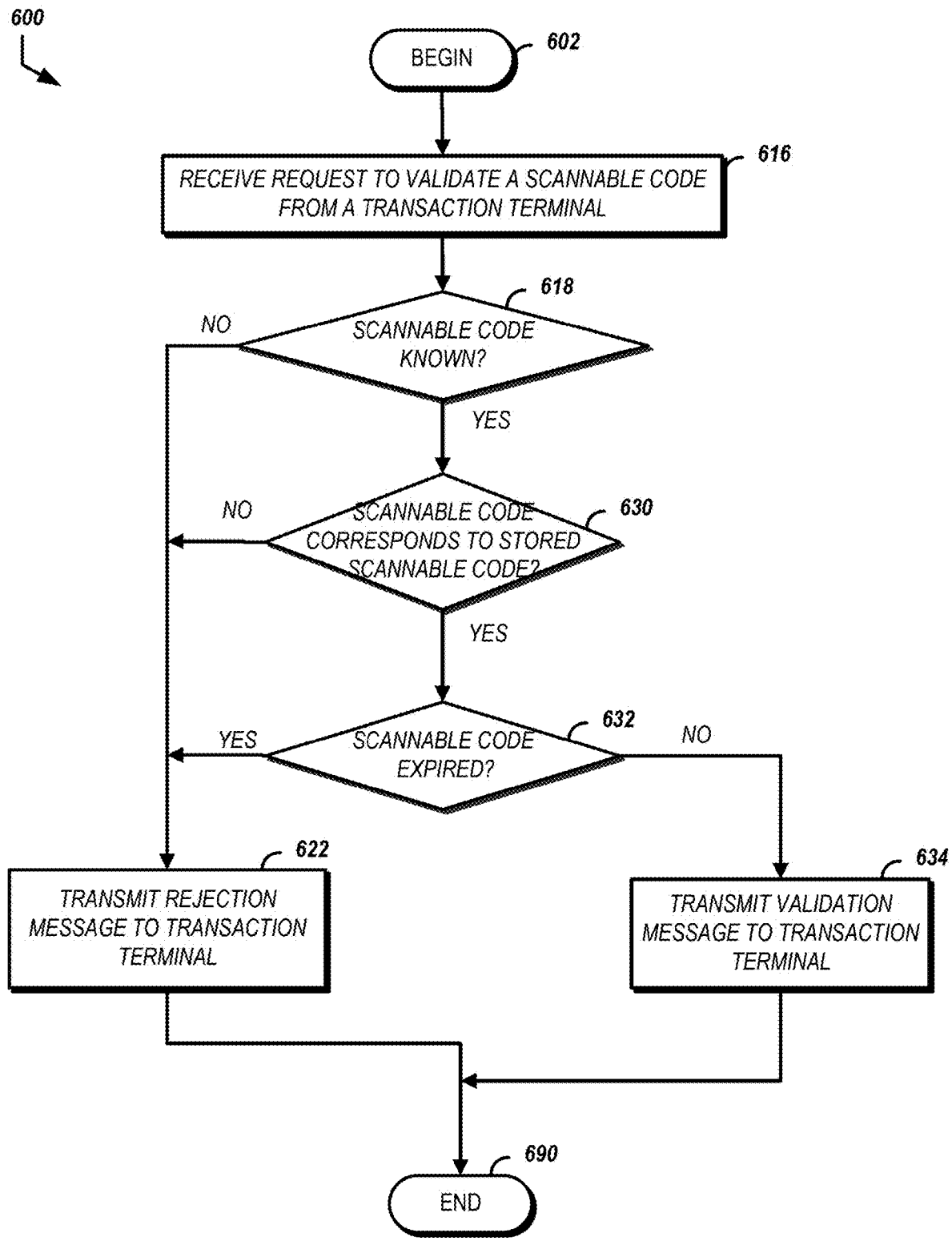
FIG. 6 is a flow diagram of an example method of providing user profile information associated with a scannable code to a transaction terminal.

FIG. 6 is a flow diagram of an example method of providing user profile information associated with a scannable code to a transaction terminal. The method 600 shows how a scannable code presented to a transaction terminal may be processed to provide user profile information associated with the scannable code. For example, the scannable code may be generated using the method 500 shown in FIG. 5 and presented by an access device to a transaction terminal. The transaction terminal may then detect the scannable code and communicate with a scannable code server to determine the validity of the code and, if valid, user profile information associated therewith.

The method 600 may be implemented in whole or in part by one or more of the devices described herein such as the scannable code server 140 shown in FIG. 1 or FIG. 2. The method 600 begins at block 602 assuming the transaction terminal has detected a scannable code. As discussed above, detecting the scannable code may include, for example, optical scanning or wireless receipt of a scannable code presented by the access device. At block 616, the scannable code server may receive a request from the transaction terminal. The request may include information about the scannable code and an indication that the transaction terminal requests validation of the code. The request may include an indication of what aspects of the user profile the transaction terminal would like to receive. For example, if the transaction terminal is a kiosk, it may be sufficient to receive demographic or membership status information from the user profile. Whereas, if the transaction terminal is a point of sale device, the transaction terminal may receive payment information or other inputs for a transaction at the point of sale. The request may include an identifier for the type of transaction performed by the transaction terminal. This type may be used to determine what information from the user profile is being requested. Transaction types may include purchase transaction, inquiry transaction (e.g., available content inquiry transaction, membership status inquiry transaction, balance inquiry, etc.), enrollment transaction, or other transaction in the physical location with the user.

The request received at block 616 may be included in a message. The message may include header information identifying the sender or device sending the message. The request may include the actual scannable code (e.g., image of a visual code) or, in some implementations, the information encoded in the scannable code. The request may be received from a transaction processing system or component included therein, such as the scanning device shown in FIG. 1.

At block 618, the scannable code server may determine whether the scannable code is known to the interactive computing system (e.g., the scannable code server). A scannable code may be known to the server if the format of the code is understood by the scannable code server. For example, if the value represented by the scannable code includes a version and/or discriminator value, the scannable code server may confirm that the version and discriminator are supported by the scannable code server. Support for a particular version or discriminator may be specified in a configuration for the scannable code server. If the version or discriminator is not supported, the code may be an unknown code.

The determination at block 618 may be based on a portion of the scannable code. For example, specific elements of the value encoded by the scannable code may indicate the discriminator or version of the scannable code. In this way, the scannable code server may only process that portion of the scannable code to determine whether the code is known, and thus able to be validated.

If the determination at block 618 is negative, the method 600 may proceed to block 622. At block 622, the scannable code server may transmit a rejection message to the device or system that transmitted the request received at block 616. The rejection message may include information indicating the reason for denying the scannable code such as if the code is unknown to the scannable code server. After transmitting the rejection message, the method 600 may continue to block 690.

At block 690, the method 600 may end having transmitted a response for scannable code to the requesting transaction terminal.

Returning to block 618, if the scannable code is known, at block 630 the scannable code server may determine whether the scannable code corresponds to a stored scannable code. The determination at block 518 may confirm whether the scannable code matches a scannable code previously generated by the scannable code server. The correspondence may be based on the location of the devices associated with the scannable codes. For example, a scannable code may be transmitted to the access device determined to be at a first location (see, e.g., FIG. 5 block 516). A scannable code may be received from a transaction processing system located at a second location (e.g., block 616). If the second location is more than a threshold distance from the first location, it may be desirable to indicate the scannable codes are not related.

The collection of scannable codes stored by the scannable code server in the token data store may serve as a directory of generated scannable codes. The scannable code or value encoded thereby may be used as a query value to determine whether the scannable code corresponds to a scannable code previously generated by the scannable code server. Correspondence at block 630 may include determining that the scannable code server generated a scannable code for the access device or user associated with the scannable code.

If the determination at block 630 is negative, the method 600 may proceed to block 622 as discussed above. The rejection message may indicate the presence of a discrepancy between the scannable code and the stored scannable codes. In some implementations, it may include an indication of the specific discrepancy (e.g., scanned code value did not match any scannable codes in the token data store, locations did not correspond, device information did not correspond, etc.).

If the determination at block 630 is affirmative, the scannable code may be positively correlated with a previously generated scannable code. At block 632, the scannable code server may perform an additional determination to confirm that the scannable code has not expired. The determination may include receiving the time from the clock and comparing the received time with the expiration time associated with the scannable code. If time exceeds the expiration time, the determination at block 632 may be affirmative. In such instances, the method 600 may proceed to block 622 as discussed above. The rejection message transmitted at block 622 may include information indicating that the scannable code has expired. In some implementations, transmitting the rejection message at block 622 may include or be accompanied by generation of a new scannable code such as shown in FIG. 5.

If the scannable code server determines at block 632 that the scannable code is not expired, at block 634, the scannable code server may transmit a validation message to the device that submitted the request received at block 616. The validation message may include at least a portion of the user profile information associated with the scannable code. The portion may be identified based on one or more of: the current location of the access device, an identifier for an application executing on the access device that requested the scannable code, or privacy preferences provided by the user indicating what aspects of the profile to disclose or conditions (e.g., location, time, access device, transaction terminal, etc.) for disclosing profile information. The user profile information may include user profile information stored by the scannable code server (e.g., user profile information retrieved at the time the code was generated, updated user profile information received from the access device). The user profile information may include payment information, subscription information, address information, or other information used by the transaction system to process a transaction with the user associated with the access device.

The transaction processing system may receive the validation message and refer to at least a portion of the user profile information included in the message for the transaction. For example, the user profile information may indicate that the user is a preferred member of the network-based service. This member status may entitle the user to a discount or other in-store incentive. Accordingly, the transaction processing system may apply the appropriate adjustment(s) to the transaction based on the identified member status.

From block 634, the method 600 may proceed to end block 690. However, the method 600 may be repeated to provide profile information associated with another scannable code to a transaction terminal.

Figure 7:
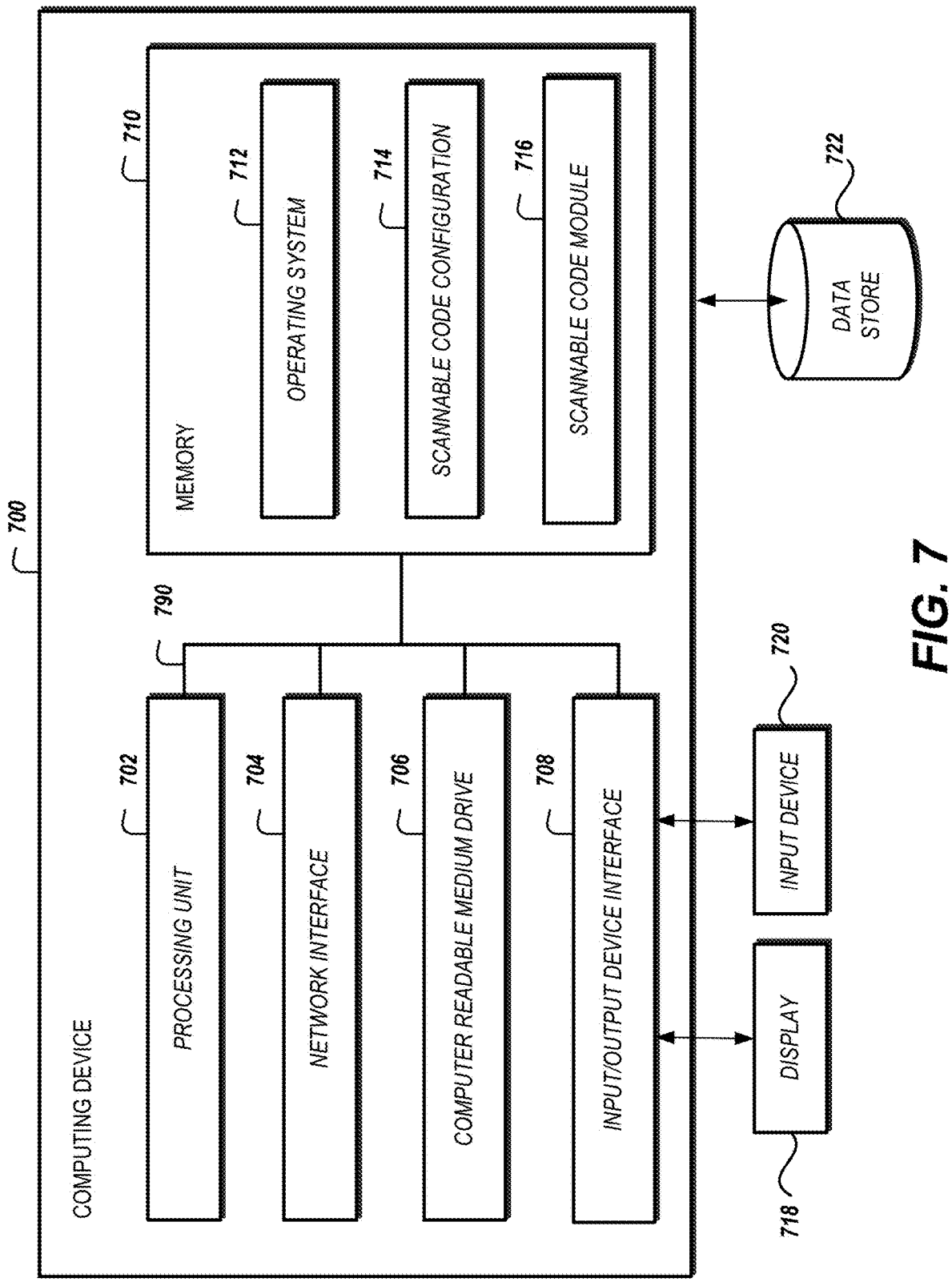
FIG. 7 is a block diagram of an illustrative computing device that implements aspects of the scannable code features described.

FIG. 7 is a block diagram of an illustrative computing device that implements aspects of the scannable code features described. The computing device 700 can be a scannable code server, and may include a processing unit 702, a network interface 704, a computer readable medium drive 706, an input/output device interface 708, and a memory 710. The network interface 704 can provide connectivity to one or more networks or computing systems. The processing unit 702 can receive information and instructions from other computing systems or services via the network interface 704. The network interface 704 can also store data directly to memory 710. The processing unit 702 can communicate to and from memory 710 and output information to an optional display 718 via the input/output device interface 708. The input/output device interface 708 can also accept input from the optional input device 720, such as a keyboard, mouse, digital pen, microphone, mass storage device, etc.

The memory 710 contains computer program instructions that the processing unit 702 executes in order to implement one or more embodiments discussed herein. The memory 710 generally includes RAM, ROM, and/or other persistent, non-transitory computer readable media. The memory 710 can store an operating system 712 that provides computer program instructions for use by the processing unit 702 or other elements included in the computing device in the general administration and operation of the computing device 700. The memory 710 can further include scannable code module 716 for implementing aspects of the present disclosure such as the method 500 shown in FIG. 5 or the method 600 shown in FIG. 6.

The memory 710 may include a scannable code configuration 714. The scannable code configuration 714 may include location thresholds, latency thresholds, expiration time minimum or maximum values, encryption information, or other values supporting the generation, transmission, or validation of scannable codes as described above. The scannable code configuration 714 may store specific values for a given configuration (e.g., a specific value for duration of a scannable code, network location of the clock). The scannable code configuration 714 may, in some implementations, store information for obtaining values for a given configuration element such as from a configuration service. For example, the duration may be obtained from a network location (e.g., URL) in conjunction with username and password information specified in the scannable code configuration 714.

The memory 710 may also include or communicate with one or more auxiliary data stores, such as data store 722. The data store 722 may electronically store data regarding the scannable codes, access devices, transaction processing systems, latency data, validation results, and the like. In some implementations, the data store 722 may implement a token data store such as the token data store 130 described above.

The elements included in the computing device 700 may be coupled by a bus 790. The bus 790 may be a data bus, communication bus, or other bus mechanism to enable the various components of the computing device 700 to exchange information.

In some embodiments, the computing device 700 may include additional or fewer components than are shown in FIG. 7. For example, a computing device 700 may include more than one processing unit 702 and computer readable medium drive 706. In another example, the computing device 702 may not be coupled to a display 718 or an input device 720. In some embodiments, two or more computing devices 700 may together form a computer system for executing features of the present disclosure.

Various features for directing stowage have been described. Additional or alternative features which may be implemented in the embodiments described include stowage to avoid storing duplicate items within the same stowage location and/or stowage locations identified to ensure an even distribution of items across the storage facility (e.g., space utilization).

In several examples, the scanning of an item was used to describe the scannable code features. In some implementations, the location determining equipment may be integrated with a container or cart in which the item to be stowed is traveling. In such implementations, the container or cart may provide the location information rather than or in conjunction with the scanning device.

In some implementations, the container or cart may be scanned to provide an identifier of all items with the container or cart. In such implementations, the system may determine a starting location for the stowage and recommend a first item for stowing. As such, the stowage resource may be directed to an area of the storage facility that will have a high density of available stowage locations for the items within the container or cart. In some implementations, it may be desirable to provide clues to the stowage resource as to where these areas might exist. For example a heat-map may be generated indicating relative density of available stowage locations, such as those which can accommodate the items within the container or cart. The density may indicate available stowage locations as a function of space. As an alternative or additional feature, the heat-map may be generated indicating relative frequency of available stowage space. The frequency may indicate the how often an available stowage location may be encountered. The frequency may indicate available stowage locations as a function of time. Using the heat-map, the stowage resource may identify a starting location to accommodate the items to be stowed. In some implementations, the availability indicators may be displayed on a heat-map.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a scannable code computing device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A scannable code computing device can be or include a microprocessor, but in the alternative, the scannable code computing device can be or include a controller, microcontroller, or state machine, combinations of the same, or the like configured to receive and process image data. A scannable code computing device can include electrical circuitry configured to process computer-executable instructions. Although described herein primarily with respect to digital technology, a scannable code computing device may also include primarily analog components. For example, some or all of the scannable code algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a scannable code computing device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the scannable code computing device such that the scannable code computing device can read information from, and write information to, the storage medium. In the alternative, the storage medium can be integral to the scannable code computing device. The scannable code computing device and the storage medium can reside in an ASIC. The ASIC can reside in a user terminal. In the alternative, the scannable code computing device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   receiving, by a server, a request for a scannable code;
   obtaining, by the server based on the request for the scannable code, profile information associated with a user profile of a user;
   generating, by the server, a first scannable code that is presentable on a mobile device associated with the user, wherein the first scannable code comprises a first token associated with the user profile of the user, and wherein the first scannable code is associated with a first expiration criterion which is based at least in part on a first timestamp of a first current time;
   transmitting, by the server, the first scannable code to the mobile device;
   receiving, by the server from a transaction processing system, a request to authenticate the first scannable code;
   determining, by the server, that the first scannable code is not accepted based at least in part on expiration of the first expiration criterion;
   receiving, by the server, network latency information representing network communication latency;
   determining, by the server, a second expiration criterion, less than a maximum duration of scannable code acceptance, based at least in part on the network latency information and a second timestamp of a second current time;
   generating, by the server, a second scannable code comprising a second token associated with the user profile, wherein the second scannable code is associated with the second expiration criterion;
   transmitting, by the server to the transaction processing system, a transaction rejection message that the first scannable code is not accepted based at least in part on expiration of the first expiration criterion; and
   transmitting, by the server to the mobile device, the second scannable code.

2. The computer-implemented method of claim 1 further comprising:
   monitoring, by the server, a regeneration time, wherein the regeneration time is specified relative to the first expiration criterion; and
   generating, by the server, the second scannable code based on the monitoring of the regeneration time.

3. The computer-implemented method of claim 2 further comprising:
   receiving, by the server, a request from the mobile device for the first scannable code; and
   determining, by the server, the regeneration time based at least in part on the network latency information, wherein the network communication latency is associated with network communication with the mobile device.

4. The computer-implemented method of claim 1 further comprising:
   receiving, by the server from a transaction processing system, a request to authenticate a received scannable code;
   determining, by the server, that the received scannable code corresponds to the second scannable code and that the second expiration criterion has not expired; and
   transmitting, by the server to the transaction processing system, information from the user profile that completes a transaction.

5. The computer-implemented method of claim 1 further comprising:
   receiving, by the server, a third timestamp of a third current time; and
   determining, by the server, expiration of the second expiration criterion based at least in part on the third timestamp and the network latency information, wherein the network communication latency is associated with network communication with the transaction processing system.

6. The computer-implemented method of claim 1 further comprising:
receiving, by the server from the mobile device, a request for the first scannable code;
receiving, by the server from the mobile device, authentication information for the user;
determining, by the server, that the user is authenticated based at least in part on the authentication information; and
in response to determining that the user is authenticated, transmitting, by the server to the mobile device, the first scannable code.

7. The computer-implemented method of claim 1 further comprising:
generating, by the server, the first expiration criterion based at least in part on the network latency information, wherein the network communication latency is associated with network communication with the mobile device.

8. The computer-implemented method of claim 1 further comprising:
receiving, by the server from the mobile device, a request for the first scannable code, the request for the first scannable code including an identifier for the mobile device; and
transmitting, by the server to the mobile device, a message regarding visual presentation of the first scannable code.

9. A system comprising:
a clock;
one or more processors; and
non-transitory computer-readable memory storing computer-executable instructions that, when executed by the one or more processors, cause the one or more processors to perform the operations of:
receive a request for a scannable code;
obtain, based on the request for the scannable code, profile information associated with a network-service profile of a user;
generate a first scannable code that is presentable on an access device associated with the user, wherein the first scannable code comprises a first token associated with the network-service profile of the user, and wherein the first scannable code is associated with first expiration criterion which is based at least in part on a first timestamp from the clock;
transmit the first scannable code to the access device;
receive, from a transaction processing system, a request to authenticate the first scannable code;
determine that the first scannable code is not accepted based at least in part on expiration of the first expiration criterion;
receive network latency information representing network communication latency;
determine a second expiration criterion, less than a maximum duration of scannable code acceptance, based at least in part on the network latency information, and a second timestamp from the clock;
generate a second scannable code comprising a second token associated with the network-service profile of the user, wherein the second scannable code is associated with the second expiration criterion;
transmit, to the transaction processing system, a transaction rejection message that the first scannable code is not accepted based at least in part on expiration of the first expiration criterion; and
transmit, to the access device, the second scannable code.

10. The system of claim 9, wherein the non-transitory computer-readable memory stores further computer-executable instructions that, when executed by the one or more processors, cause the one or more processors to perform the operations of:
monitor a regeneration time, wherein the regeneration time is specified relative to the first expiration criterion; and
generate the second scannable code based on monitoring the regeneration time.

11. The system of claim 10, wherein the non-transitory computer-readable memory stores further computer-executable instructions that, when executed by the one or more processors, cause the one or more processors to perform the operations of:
receive a request from the access device for the first scannable code; and
determine the regeneration time based at least in part on the network latency information, wherein the network communication latency is associated with network communication with the access device.

12. The system of claim 9, wherein the non-transitory computer-readable memory stores further computer-executable instructions that, when executed by the one or more processors, cause the one or more processors to perform the operations of:
receive a third timestamp from the clock; and
determine expiration of the second expiration criterion based at least in part on the third time stamp and the network latency information, wherein the network communication latency is associated with network communication with the transaction processing system.

13. The system of claim 9, wherein the non-transitory computer-readable memory stores further computer-executable instructions that, when executed by the one or more processors, cause the one or more processors to perform the operations of generate the first expiration criterion based at least in part on the latency information, wherein the network communication latency is associated with network communication with the access device.

14. The system of claim 9, wherein the non-transitory computer-readable memory stores further computer-executable instructions that, when executed by the one or more processors, cause the one or more processors to perform the operation of: transmit a near field communication message including information represented by the first scannable code.

15. The system of claim 9, wherein the non-transitory computer-readable memory stores further computer-executable instructions that, when executed by the one or more processors, cause the one or more processors to perform the operations of:
obtain payment information for the user from the network-service profile, wherein the first scannable code is generated based at least in part on the payment information;
receive, from the transaction processing system, a second request to authenticate the second scannable code;
determine the second expiration criterion has not expired; and
transmit, to the transaction processing system, at least a portion of the network-service profile for the user.

16. The system of claim 9, wherein the non-transitory computer-readable memory stores further computer-executable instructions that, when executed by the one or more processors, cause the one or more processors to perform the operations of:
- determine a first total duration of scannable code acceptance based on a base duration for scannable code acceptance, a first latency duration value for network communication of the system with the transaction processing system, and a second latency duration value for network communication of the system with the access device;
- determine the first total duration of scannable code acceptance exceeds the maximum duration for scannable code acceptance;
- determine a second total duration of scannable code acceptance based on the base duration for scannable code acceptance and the first latency duration value; and
- determine the second total duration of scannable code acceptance does not exceed the maximum duration for scannable code acceptance, wherein the second expiration criterion is based on the second total duration of scannable code acceptance.

17. The system of claim 9, wherein the non-transitory computer-readable memory stores further computer-executable instructions that, when executed by the one or more processors, cause the one or more processors to perform the operations of:
- receive, from the access device, a message that the second scannable code is expired based on a location of the access device; and
- determine that the second scannable code is expired based on the message.

18. The system of claim 9, wherein the non-transitory computer-readable memory stores further computer-executable instructions that, when executed by the one or more processors, cause the one or more processors to perform the operations of:
- generate an identifier associated with the system, wherein the second scannable code comprises the identifier associated with the system;
- receive, from the transaction processing system, a request to authenticate the second scannable code; and
- authenticate the second scannable code based on the second scannable code comprising the identifier associated with the system.

* * * * *